United States Patent

[11] 3,607,419

[72] Inventor Stephen J. Keating, Jr.
West Hartford, Conn.
[21] Appl. No. 862,855
[22] Filed Oct. 1, 1969
[45] Patented Sept. 21, 1971
[73] Assignee United Aircraft Corporation
East Hartford, Conn.

[54] FUEL CELL SYSTEM CONTROL
2 Claims, 1 Drawing Fig.
[52] U.S. Cl. ................................................. 136/86 B
[51] Int. Cl. ........................................... H01m 27/12
[50] Field of Search ..................................... 136/86 B

[56] References Cited
UNITED STATES PATENTS
3,266,938 8/1966 Parker et al. .................. 136/86
3,516,807 6/1970 West et al. .................... 136/86

Primary Examiner—Winston A. Douglas
Assistant Examiner—H. A. Feeley
Attorney—Edmund C. Meisinger ABSTRACT: A fuel cell system is controlled responsive to the hydrogen partial pressure in the anode effluent and the reformer-reactor temperature. The control concerns regulating stream flow to a venturi mixer dependent upon the hydrogen partial pressure. Auxiliary fuel flow may be scheduled responsive to abrupt changes in gross current to eliminate the time lapse normally associated with flow of fuel from the reformer to the fuel cell. Supplemental fuel is supplied to the reformer-burner dependent upon reactor temperature.

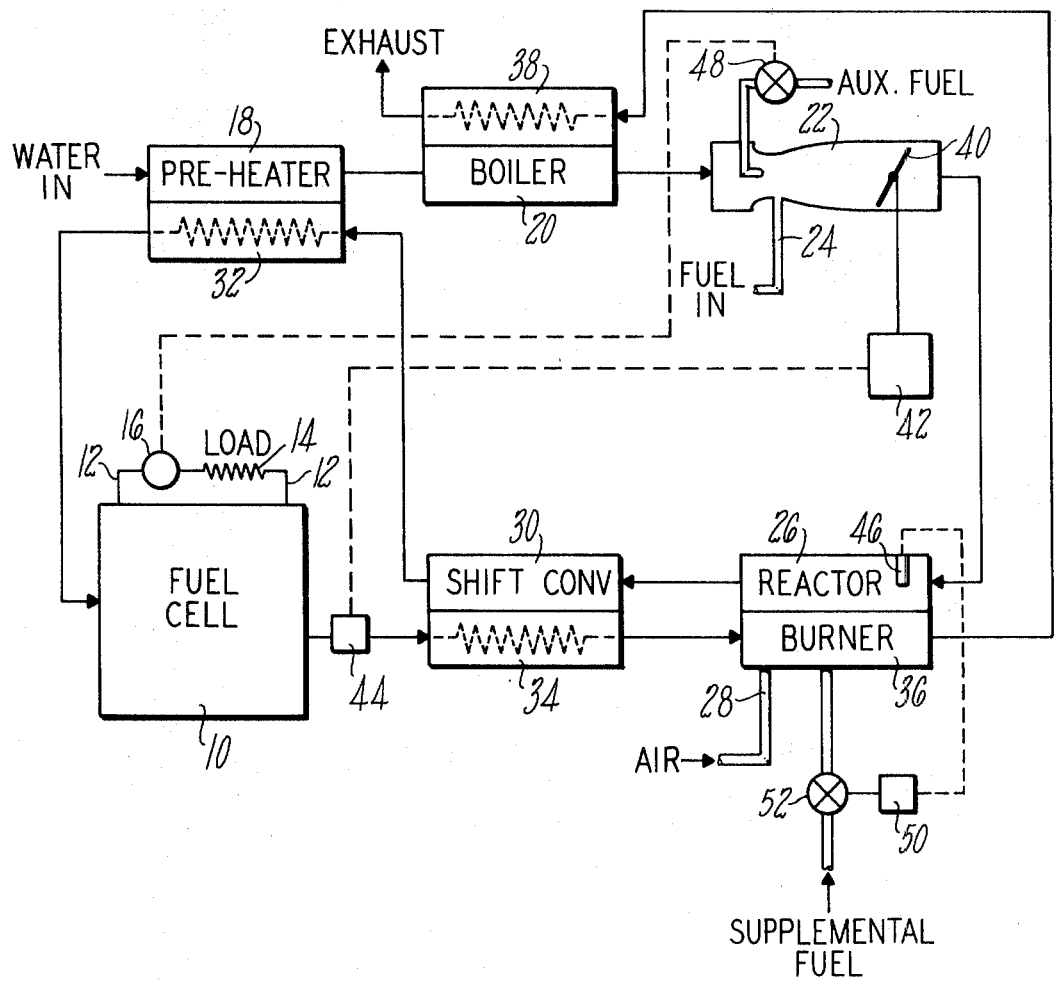

3,607,419

FUEL CELL SYSTEM CONTROL

BACKGROUND OF THE INVENTION

This invention pertains to a control for fuel cell systems. More specifically, this invention pertains to controlling the steam flow and resultant fuel flow to a reformer as a function of a selected system variable and maintaining reactor temperature.

Generally, pure hydrogen has been recognized as the preferred fuel for fuel cells and its coreactant has generally been oxygen or air. Fuel cells have been developed which utilize relatively impure hydrogen or other oxidizable fuels. Because of a desire to produce electric current from relatively small powerplants, there has been considerable effort expended to produce a system which is readily adaptable to operation on fuels commonly available. Various techniques have been proposed for converting hydrocarbons and other hydrogen containing carbonaceous feedstocks into hydrogen for use in fuel cells, but primary emphasis has been placed upon steam reforming at relatively high temperatures. Typically, high-pressure steam reformed feedstock has been passed through palladium-silver separators to provide pure hydrogen for the fuel cell. In some fuel cells, for example the carbon dioxide tolerant cells and cells which use carbon monoxide tolerant catalysts, it is possible to use a low-pressure reformer where no separation of hydrogen from the undesirable gases in the feedstock is necessary. In any of these systems, numerous techniques have been utilized in controlling the hydrogen reforming process in cooperation with the demands of the fuel cell. Control of these systems presents numerous problems. It is known to monitor reactant pressures, humidity levels, electrolyte concentration, flow rates, and a number of other parameters to keep the fuel cell system under optimum conditions.

The fuel cell is a demand system wherein electrochemical reactions proceed at a moderate rate when the external load circuit is closed. Fuel must be supplied to the fuel cell so that current can continue to be generated. It is axiomatic that the reforming process must be adapted to conform to the demand requirements of the fuel cell.

SUMMARY OF THE INVENTION

It is an object of this invention to provide an improved method of controlling a fuel cell system.

Another object of this invention is the regulation of the reformer steam and fuel feed responsive to the hydrogen consumption demands of the fuel cell while maintaining the reactor temperature. The system features the use of a venturi-type mixer to maintain the fuel to steam ratio desired in the reformer and to control the rate of flow of the mixture.

In accordance with this invention, hydrogen partial pressure in the anode exhaust from the fuel cell is sensed and used to control the steam flow through the venturi. As the primary steam flow in the venturi increases, the secondary flow of fuel will similarly increase. These streams mix and are supplied to the catalytic reactor section of the reformer where the fuel is steam reformed to provide hydrogen and other residual gases. Thereafter, this mixture is directed to the fuel cell. To improve transient response, reactor temperature is sensed and the flow of supplemental fuel to the reactor burner adjusted accordingly.

BRIEF DESCRIPTION OF THE DRAWING

The single FIGURE is a schematic of a fuel cell system embodying the control of the present invention.

DESCRIPTION OF THE PREFERRED EMBODIMENT

Referring to the FIGURE, a fuel cell stack 10 is shown having output leads 12 through which electrons generated in the individual fuel cells are made available to the external load 14. Sensor 16 responds to fuel cell gross current. Water is supplied to preheater 18 where the temperature of the water supply increases prior to entry into the boiler 20 where the water supply is converted to steam. The steam is ducted to venturi 22 where fuel is aspirated thereinto by virtue of the flow of steam. Fuel is supplied through conduit 24. The mixture of fuel and steam is directed to the reactor 26 portion of a reformer. In the reactor 26, fuel is steam reformed in the presence of a catalyst to the individual constituents of the fuel which typically are hydrogen, carbon dioxide, carbon monoxide, and certain residual water and methane. The steam reformed fuel is thereafter directed to a shift converter 30 where carbon monoxide reacts with residual water to produce carbon dioxide and additional hydrogen. This stream is passed through the heat exchanger 32 where heat is supplied to preheat the water supply. The hydrogen rich feedstock stream, at a decreased temperature, is directed through the anode compartments of the fuel cell stack 10.

Ordinarily, more fuel is circulated through the cell than will be utilized in the fuel cell. It is generally desirable to design fuel cells to operate at a constant fuel utilization. Thus the hydrogen partial pressure at the fuel cell exit ideally remains a constant. The amount of utilization is determined in part by the excess fuel that must be left to go to the burner and thus to heat the reactor. The excess of the circulated fuel corresponds to the anode effluent and discharges from the cell stack and is directed through heat exchanger 34 associated with the exothermic shift converter 30 where heat is added. The stream from the fuel cell is directed to the burner 36 in the reformer where the stream is combusted with air from duct 28, to supply heat for the steam reforming reaction which occurs in the reactor 26. The burned exhaust gases exit through the heat exchanger 38 adjacent boiler 20.

The reformer fuel to steam ratio is maintained by the venturi mixer in which the steam flow is set proportional to demand by a valve 40. The valve 40 is controlled by regulator 42 which is responsive to a signal from the hydrogen partial pressure sensor 44. Hydrogen partial pressure is maintained constant at a predetermined level regardless of fuel cell load by increasing the feed flow to the reformer as hydrogen partial pressure decreases and decreasing the feed flow as hydrogen partial pressure increases. As steam flow increases by opening of the valve 40, additional fuel enters at the throat of the venturi due to the lowering of pressure there with increased flow. Auxiliary fuel can also be injected at the venturi throat if required to handle sudden positive transients. The sensing of sudden transients is conveniently determined by the current sensor 16 and transmitted to regulator 48 which monitors the auxiliary fuel flow.

The fuel cell is a demand system. Consequently, the reformer must replenish the fuel used in the electrochemical reactions occuring within the fuel cell. The reformer feed is a mixture of steam and fuel and is scheduled to increase with decreasing hydrogen partial pressure in the anode exit stream. If the fuel supply is below that required by both the fuel cell and the reformer burner, a condition which can occur during positive load transients, an insufficient amount of gas will exit from the cell stack and be burned in the reformer. Thus, reformer temperature decreases and reaction rate decreases accordingly. Sensor 46 detects this temperature change which is a departure from the normal operating temperature of the reactor and the control 50 converts this information to a signal which operates valve 52 to provide supplemental fuel directly to the burner to quickly bring it back up to correct temperature. This is done to avoid the time delay which would otherwise be encountered due to the need for the increased feedstock flow called for at the venturi valve 40 by the hydrogen partial pressure sensor 44 to make its way around the system to the burner.

Summarizing, the system is designed so that as fuel cell effluent hydrogen partial pressure changes with load, fuel and steam feed flow to the reformer is changed to bring the partial pressure back to a predetermined value. Use of a venturi-type fuel and water control automatically provides steam proportional to the fuel without the need for metering either the fuel or the water supply. For example, no fuel pump is required if the proper height relationship is established between the fuel inlet in the venturi and the fuel tank. The venturi has been shown with an auxiliary fuel supply to handle sudden large positive transients which is controlled by a system sensing fuel cell output current. Supplemental fuel is provided directly to the burner to maintain reactor temperature during sudden positive load transients when the increased feedstock flow would otherwise cool the reactor below normal operating limits. This decouples fuel cell and reformer problems during transients and also during starting.

Although the invention has been shown and described with respect to a preferred embodiment, it should be understood by those skilled in the art that various changes and omissions in the form and detail may be made therein without departing from the spirit and the scope of the invention.

I claim:

1. In a fuel cell system having a fuel cell stack consisting essentially of a plurality of individual cells in stacked relation, each cell including spaced oxidant and fuel electrodes, and electrolyte space therebetween, and chambers on the sides of the electrodes opposite the electrolyte space for oxidant and fuel gas respectively and having a reactor wherein a feed mixture of fuel and steam is steam reformed in the presence of a catalyst with heat supplied by a burner thereby producing a hydrogen containing fuel stream as a source of fuel for the fuel cell, the method of regulating the feed mixture to the reformer comprising:

maintaining fuel to steam ratio to the reactor by a venturi mixer where steam is the primary flow and fuel is aspirated thereinto;
sensing the hydrogen partial pressure in the fuel cell anode exhaust and sensing the reactor-operating temperature;
controlling the steam flow through the venturi mixer as a function of hydrogen partial pressure in the anode exhaust;
providing supplemental fuel flow to the burner during positive load transients as a function of reactor temperature.

2. The method claim 1, including:

injecting auxiliary fuel at the venturi throat responsive to abrupt increases in fuel cell gross current.